(12) United States Patent
Ishida et al.

(10) Patent No.: US 10,540,518 B2
(45) Date of Patent: **\*Jan. 21, 2020**

(54) PRIVACY ANNOTATION FROM DIFFERENTIAL ANALYSIS OF SNAPSHOTS

(71) Applicant: INTERNATIONAL BUSINESS MACHINES CORPORATION, Armonk, NY (US)

(72) Inventors: Ai Ishida, Tokyo (JP); Takuya Mishina, Tokyo (JP); Yuji Watanabe, Tokyo (JP)

(73) Assignee: INTERNATIONAL BUSINESS MACHINES CORPORATION, Armonk, NY (US)

(\*) Notice: Subject to any disclaimer, the term of this patent is extended or adjusted under 35 U.S.C. 154(b) by 125 days.

This patent is subject to a terminal disclaimer.

(21) Appl. No.: 15/808,432

(22) Filed: Nov. 9, 2017

(65) Prior Publication Data
US 2018/0276405 A1 Sep. 27, 2018

Related U.S. Application Data

(63) Continuation of application No. 15/467,616, filed on Mar. 23, 2017.

(51) Int. Cl.
*G06F 21/62* (2013.01)
(52) U.S. Cl.
CPC .................. *G06F 21/6245* (2013.01)
(58) Field of Classification Search
CPC .. G06F 21/6245; G06F 16/128; G06F 16/217; G06F 21/50; G06F 21/6209; G06F 21/10; H04L 63/1408
See application file for complete search history.

(56) References Cited

U.S. PATENT DOCUMENTS 8,429,745 B1 4/2013 Casaburi et al.
8,539,561 B2 9/2013 Gupta et al.
(Continued)

OTHER PUBLICATIONS

Simson Garfinkel et al, A general strategy for differential forensic analysis, Elsevier Ltd. (Year: 2012).\*
(Continued)

*Primary Examiner* — Shanto Abedin
(74) *Attorney, Agent, or Firm* — Tutunjian & Bitetto, P.C.; Vazken Alexanian

(57) ABSTRACT

A method is provided for preventing divulgation of sensitive data in two snapshots, taken at different times, of one or more same systems in a cloud environment. The method includes identifying a set of files from among a plurality of file pairs. Each file pair is formed from a respective file that includes at least one difference with respect to each snapshot. The method includes performing a pattern reducing process that removes, from the set of files, any of the files having, as the difference, a predetermined non-sensitive difference between respective executions of a pre-determined system operation. The method includes performing a commonality reducing process that removes, from the set of files, any files having, as the difference, a common difference between different users. The method includes annotating data in remaining files in the set of files as potentially being the sensitive data, subsequent to the reducing processes.

16 Claims, 9 Drawing Sheets

(56) References Cited

U.S. PATENT DOCUMENTS

| | | | |
|---|---|---|---|
| 8,832,224 B1 | 9/2014 | Pauley et al. | |
| 10,127,662 B1* | 11/2018 | Reicher | G06F 16/583 |
| 2004/0070678 A1* | 4/2004 | Toyama | H04N 1/00132 |
| | | | 348/231.3 |
| 2007/0050416 A1* | 3/2007 | Battagin | G06F 16/972 |
| 2008/0168073 A1* | 7/2008 | Siegel | G06F 21/10 |
| 2014/0351217 A1* | 11/2014 | Bostock | G06F 16/128 |
| | | | 707/639 |
| 2015/0082022 A1 | 3/2015 | Marinkovic et al. | |
| 2016/0070905 A1* | 3/2016 | Antoun | G06F 21/50 |
| | | | 726/1 |
| 2016/0224259 A1 | 8/2016 | Ahrens et al. | |
| 2017/0242935 A1* | 8/2017 | Wragg | G05B 19/0423 |

OTHER PUBLICATIONS

List of IBM Patents or Patent Applications Treated as Related dated Nov. 9, 2017, 2 pages.

* cited by examiner

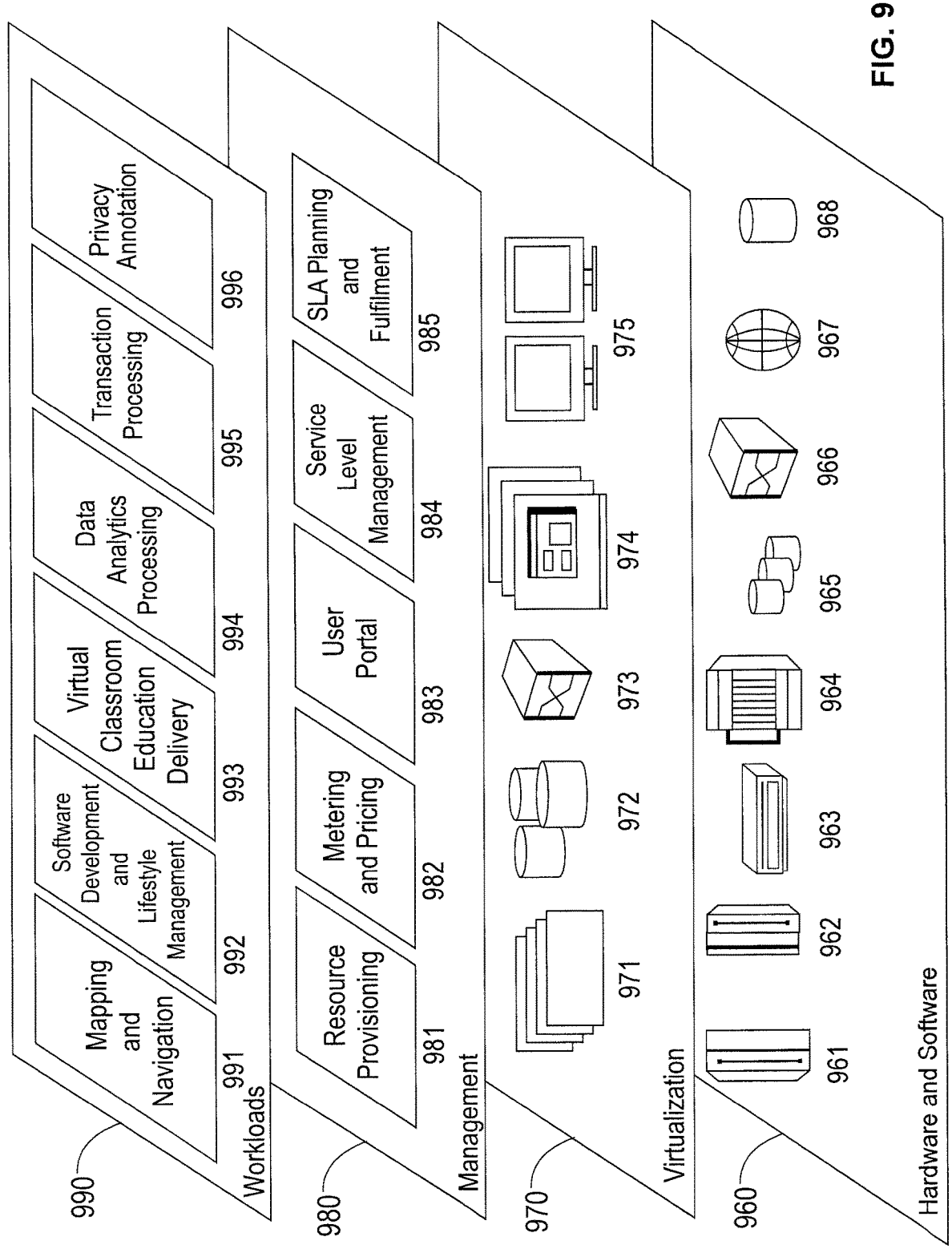

PRIVACY ANNOTATION FROM DIFFERENTIAL ANALYSIS OF SNAPSHOTS

BACKGROUND

Technical Field

The present invention relates generally to information processing and, in particular, to privacy annotation from differential analysis of snapshots.

Description of the Related Art

Recent advances in virtualization technology allows users to support system flexibly by keeping an interim state of the system as an image over time, and by rolling back the deployed system to a previous state using a retained past image.

In DevOps scenarios, users tend to use the same image multiple times to shorten the time for deployment and initial configuration.

Images could include the whole system state, including sensitive information such as passwords and system confidential unique parameters. Such sensitive information needs to be removed from images before sharing them with others. However, achieving a perfect removal of sensitive information is often very time-consuming, and/or difficult to complete manually.

Thus, there is a need for identifying small differences from a differential analysis of a snapshot, e.g., in order to remove the aforementioned sensitive information from the snapshot.

SUMMARY

According to an aspect of the present invention, a computer-implemented method is provided for preventing divulgation of sensitive data in two snapshots, taken at different times, of one or more same systems in a cloud environment. The method includes identifying a set of files from among a plurality of file pairs. Each of the plurality of file pairs is formed from a respective file that includes at least one difference with respect to each of the two snapshots. The method further includes performing a pattern reducing process that removes, from the set of files, any of the files having, as the at least one difference, a predetermined non-sensitive difference between respective executions of a pre-determined system operation. The method also includes performing a commonality reducing process that removes, from the set of files, any of the files having, as the at least one difference, a common difference between different system users. The method additionally includes annotating data in remaining ones of the files in the set of files as potentially being the sensitive data, subsequent to the pattern reducing and commonality reducing processes.

According to another aspect of the present invention, a computer program product is provided for preventing divulgation of sensitive data in two snapshots, taken at different times, of one or more same systems in a cloud environment. The computer program product has a non-transitory computer readable storage medium having program instructions embodied therewith. The program instructions are executable by a computer to cause the computer to perform a method. The method includes identifying a set of files from among a plurality of file pairs, each of the plurality of file pairs being formed from a respective file that includes at least one difference with respect to each of the two snapshots. The method further includes performing a pattern reducing process that removes, from the set of files, any of the files having, as the at least one difference, a predetermined non-sensitive difference between respective executions of a pre-determined system operation. The method also includes performing a commonality reducing process that removes, from the set of files, any of the files having, as the at least one difference, a common difference between different system users. The method additionally includes annotating data in remaining ones of the files in the set of files as potentially being the sensitive data, subsequent to the pattern reducing and commonality reducing processes.

According to yet another aspect of the present invention, a system is provided for preventing divulgation of sensitive data in two snapshots, taken at different times, of one or more same systems in a cloud environment. The system includes one or more processors. The one or more processors are configured to identify a set of files from among a plurality of file pairs, each of the plurality of file pairs being formed from a respective file that includes at least one difference with respect to each of the two snapshots. The one or more processors are further configured to perform a pattern reducing process that removes, from the set of files, any of the files having, as the at least one difference, a predetermined non-sensitive difference between respective executions of a pre-determined system operation. The one or more processors are also configured to perform a commonality reducing process that removes, from the set of files, any of the files having, as the at least one difference, a common difference between different system users. The one or more processors are additionally configured to annotate data in remaining ones of the files in the set of files as potentially being the sensitive data, subsequent to said pattern reducing and commonality reducing processes.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 9 shows an exemplary set of functional abstraction layers provided by the cloud computing environment shown in FIG. 8, in accordance with an embodiment of the present invention.

DETAILED DESCRIPTION

The present invention is directed to privacy annotation from differential analysis of snapshots.

In an embodiment, the present invention is deployed in an environment having multiple hosts, and a data store. Information of selected files (interchangeably referred to herein as a "snapshot") on each host is maintained (stored) periodically by the data store. A snapshot can include, for example, a file name and/or file attributes including, but not limited to, a digest value (hash) of file contents of the selected files. The file selections can be predefined.

In an embodiment, the present invention can be applied to a set of known normal server operations and corresponding information including, but not limited to, for example: package installation; and typical server configuration change information such as a Secure Shell (SSH) server configuration.

Figure 1:
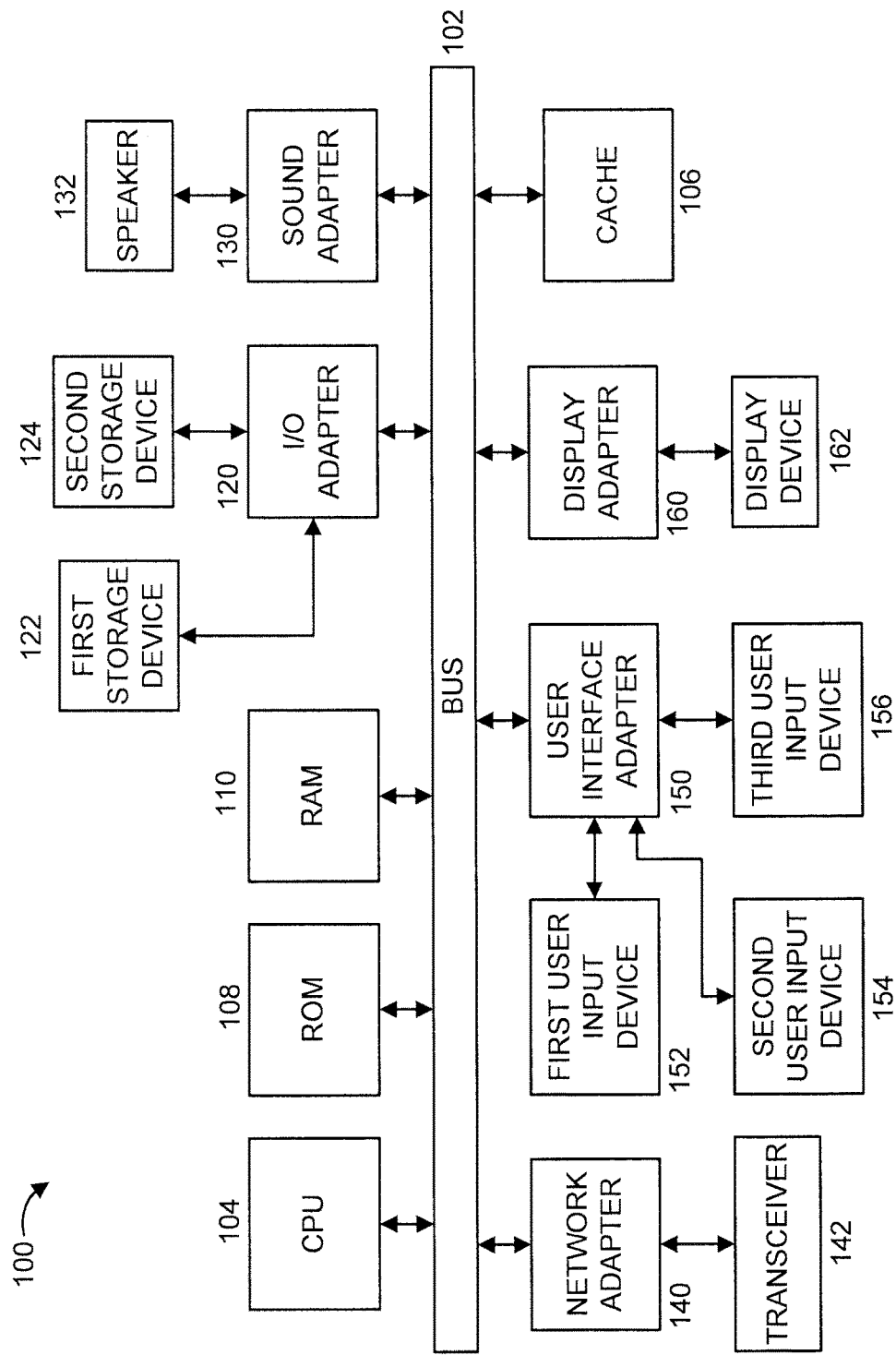
FIG. 1 shows an exemplary processing system to which the present invention may be applied, in accordance with an embodiment of the present invention.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
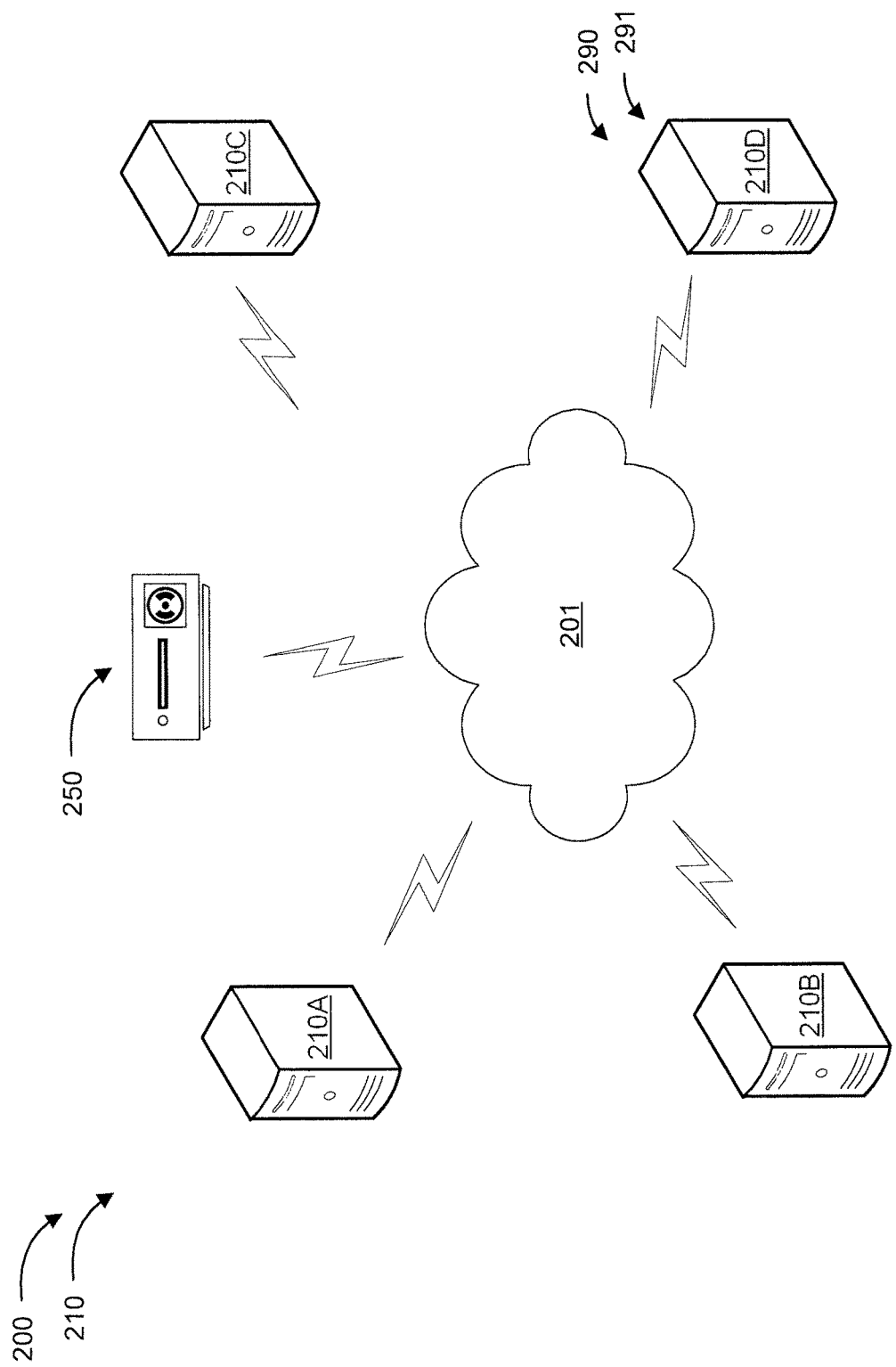
FIG. 2 shows an exemplary environment to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 3:
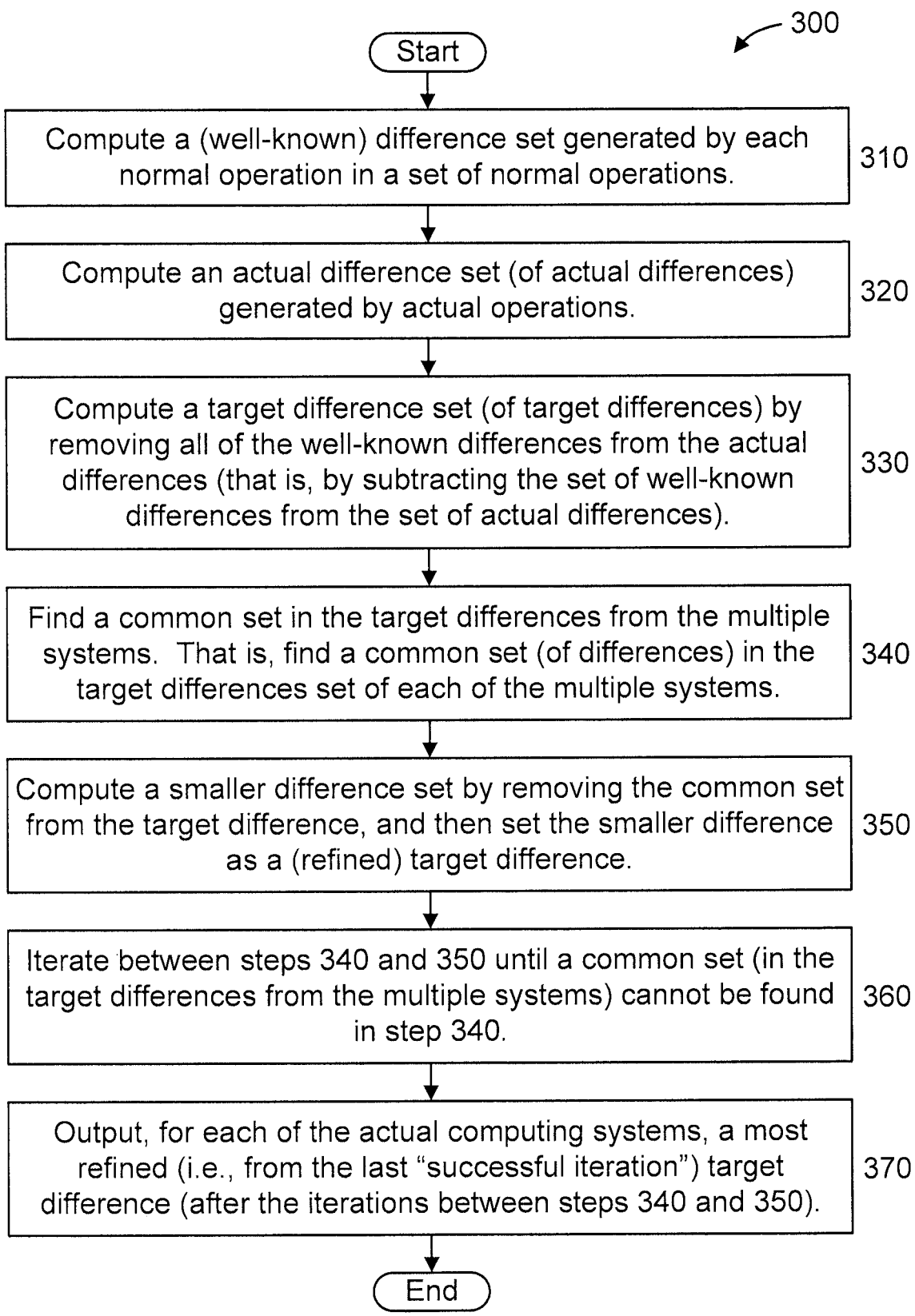
FIG. 3 shows an exemplary method for snapshot difference processing, in accordance with an embodiment of the present invention.
Figure 4:
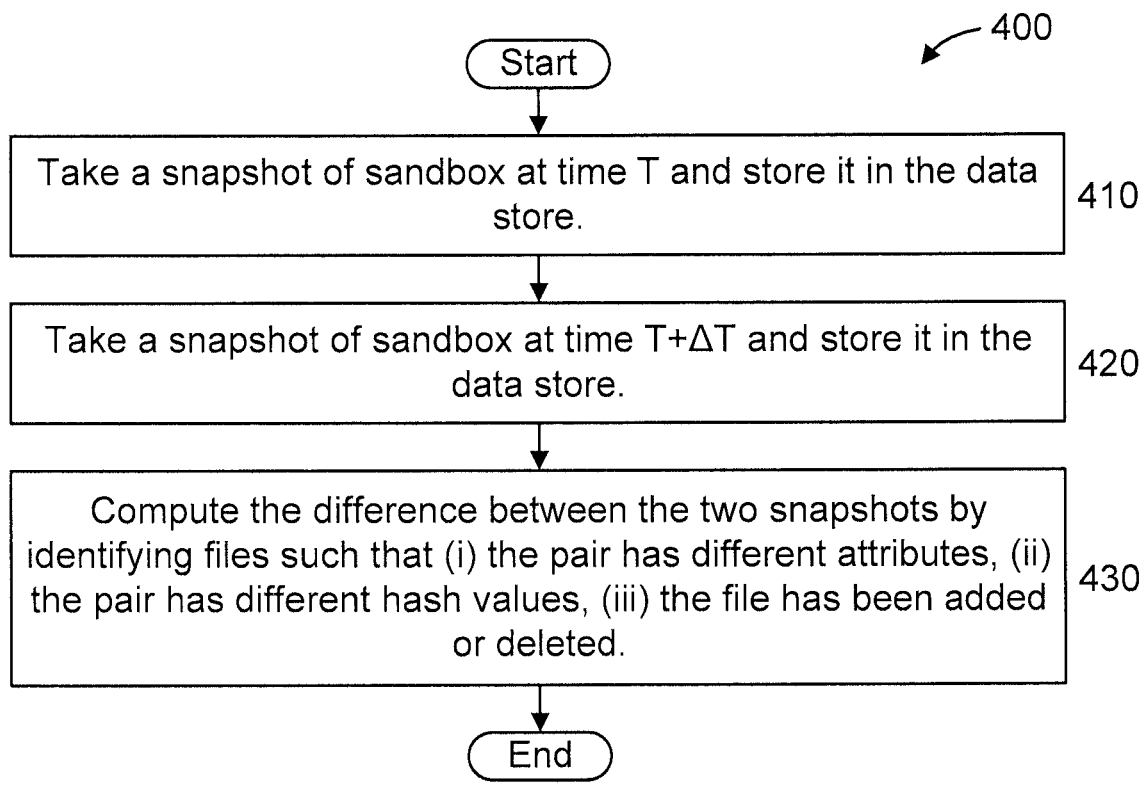
FIG. 4 shows another exemplary method for computing the difference between a snapshot of a (sandbox or an actual) system at time T and at T+ΔT, in accordance with an embodiment of the present invention.
Figure 5:
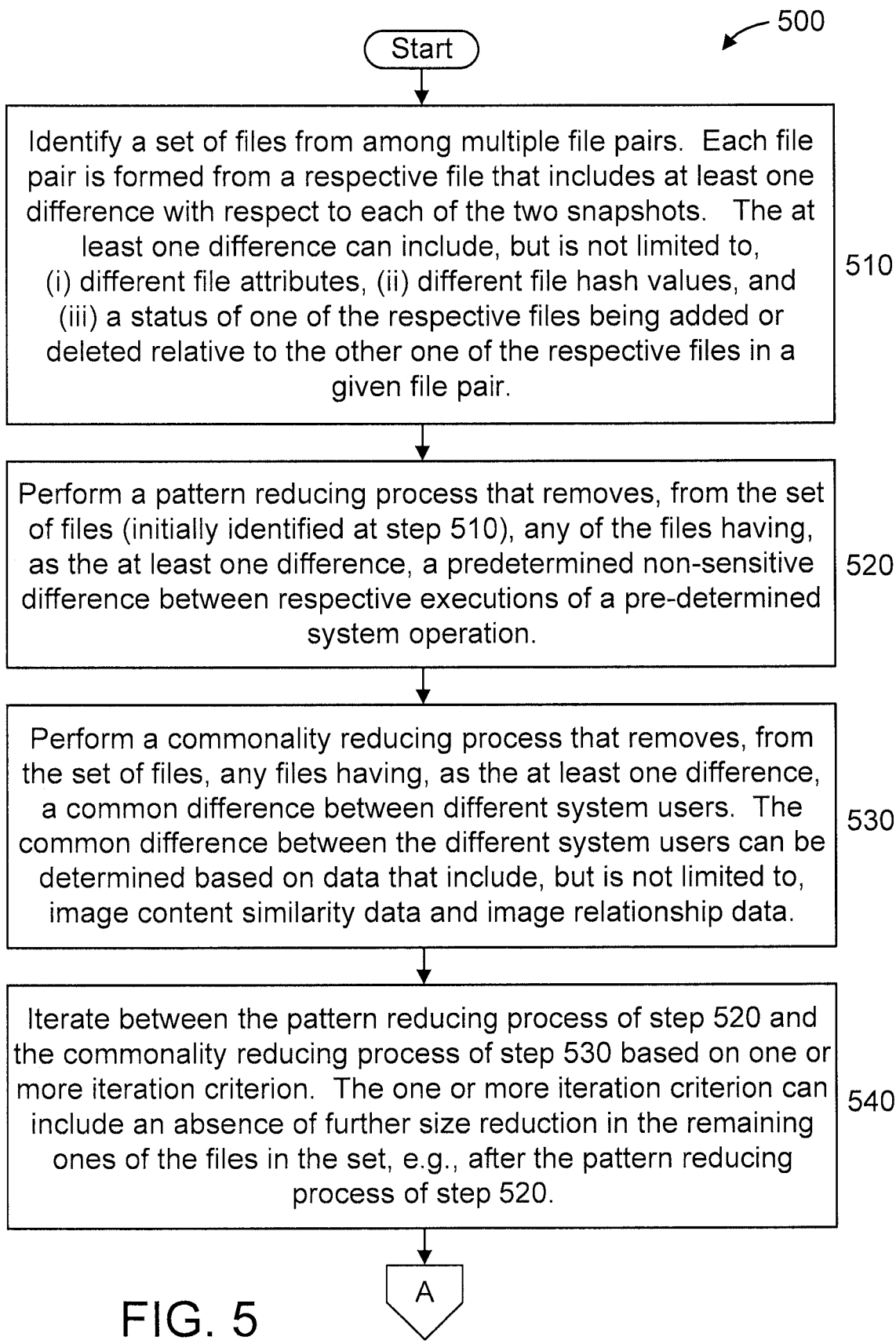
FIGS. 5-7 show another exemplary method for snapshot difference processing, in accordance with an embodiment of the present invention.
Figure 6:
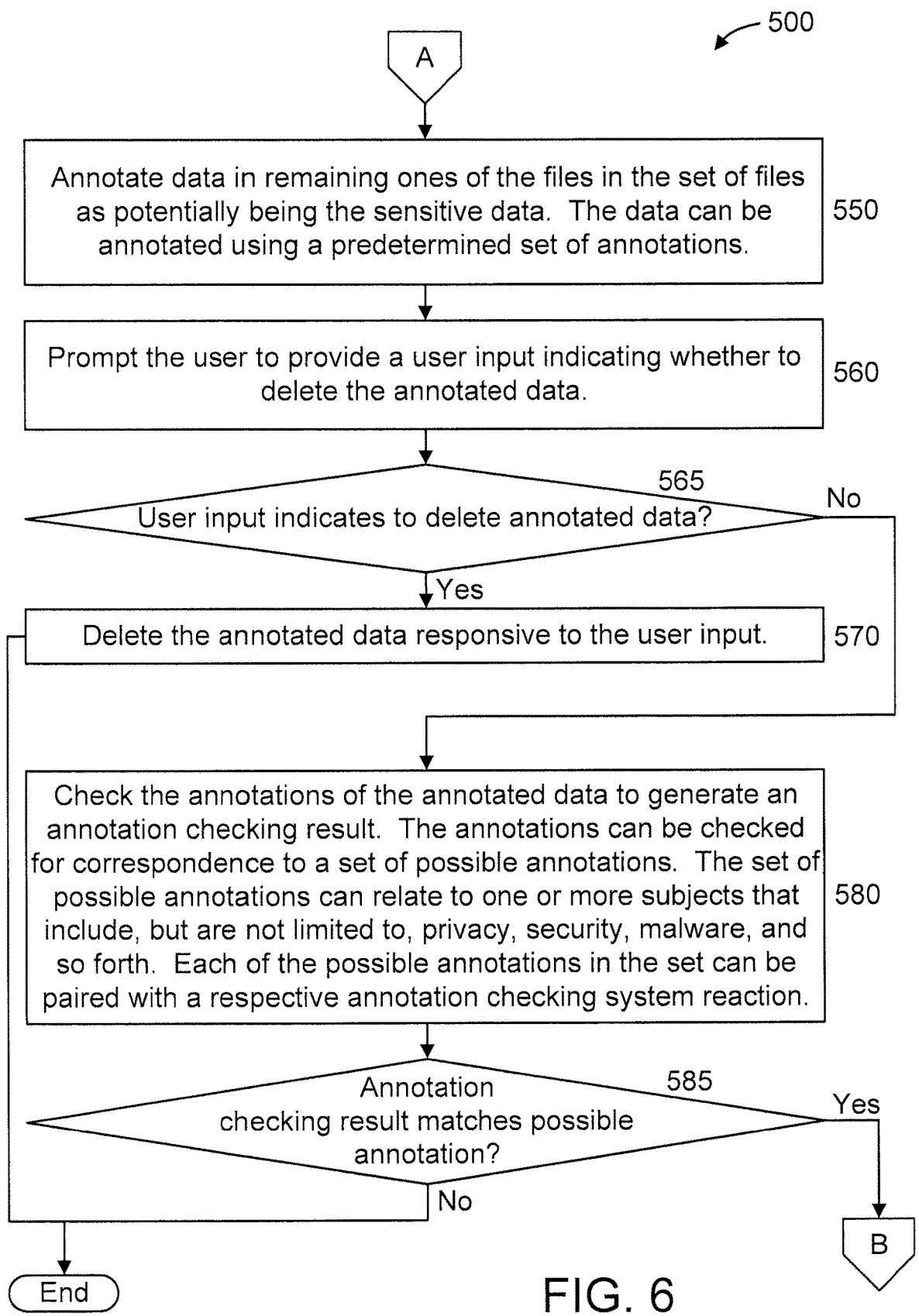
Figure 7:
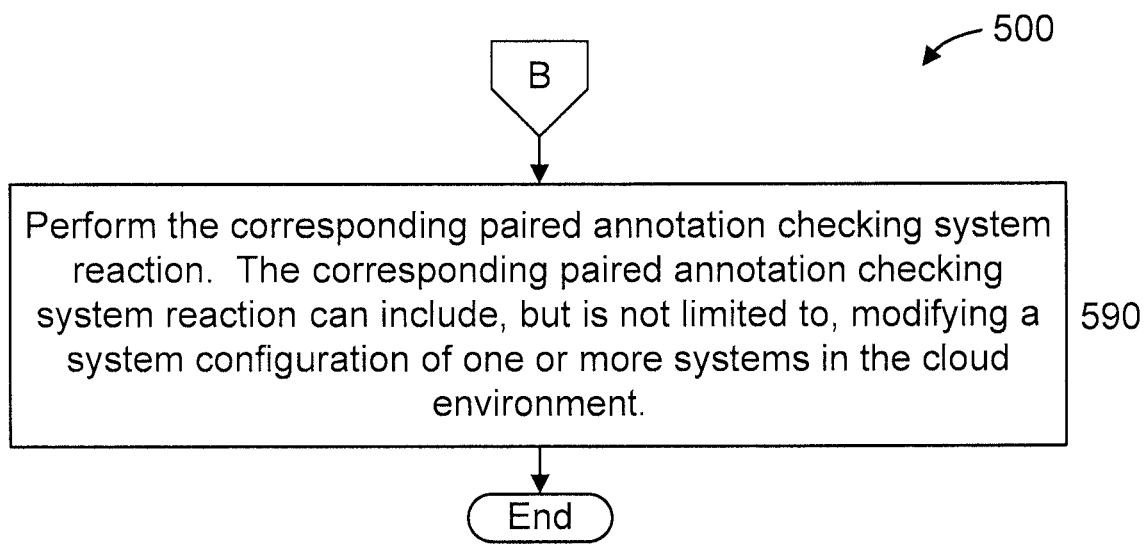

Further, it is to be appreciated that processing system 100 may perform at least part of the methods described herein including, for example, at least part of method 300 of FIG. 3 and/or at least part of method 400 of FIG. 4 and/or at least part of method 500 of FIGS. 5-7. Similarly, part or all of environment 200 may be used to perform at least part of method 300 of FIG. 3 and/or at least part of method 400 of FIG. 4 and/or at least part of method 500 of FIGS. 5-7.

FIG. 2 shows an exemplary environment 200 to which the present invention can be applied, in accordance with an embodiment of the present invention.

The environment 200 includes a set of computing systems, interchangeably referred to as "hosts" or "computing devices", and collectively and singularly denoted by the figure reference numeral 210. The set of computing systems 210 are configured using a cloud configuration. Exemplary cloud configurations are described herein below.

The set of computing systems 210 includes actual computing systems 210A-210C (e.g., servers, etc.) and a computing system 210D. The computing system 210D is configured to include a Sandbox host 290 having one or more Sandboxes (hereinafter "Sandbox" in short) 291.

As is known, a Sandbox host is a host on which computer program code can be tested while protecting a "live" computing system and its data from changes that could be damaging and/or unwanted. It is to be appreciated that the phrases "live computing system" and "actual computing system" are used interchangeably herein.

The present invention involves privacy annotation from differential analysis of snapshots. The snapshots can be of one or more of any of the computing systems 210.

Various steps of the methods described herein can be performed using the set of computing systems 210 in different configurations, as further described herein below. For example, some steps of the methods can be performed by and/or otherwise relate to actual computing systems (e.g., actual computing systems 210A-210C) while other steps of the methods can be performed by and/or otherwise relate to a Sandbox (e.g., Sandbox 291). It is to be appreciated that other configurations are readily implemented by one of ordinary skill in the art given the teachings of the present invention provided herein, while maintaining the spirit of the present invention.

The environment 200 further includes a data store 250 that is accessible by the set of computing systems 210. The data snapshots and/or other data pertinent to the present invention can be stored in the data store 250. In an embodiment, the data store 250, or a different memory device, is used to store predetermined differences that can be used in the pattern reducing process described in detail herein below. In this way, efficient annotation of sensitive information can be achieved. In the example of FIG. 2, the data store 250 is implemented as a standalone device. However, in other embodiments, the data store can be included in one or more of the computing systems 210.

In the embodiment shown in FIG. 2, the elements thereof are interconnected by a network(s) 201. However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present invention provided herein, while maintaining the spirit of the present invention.

FIG. 3 shows an exemplary method 300 for snapshot difference processing, in accordance with an embodiment of the present invention. The snapshot processing can include computing smaller, more reduced, more targeted differences from actual differences, as further explained in detail herein.

The method 300 can involve multiple Sandbox hosts, multiple actual computing systems, or a mix of Sandbox hosts and actual computing systems. For the sake of illustration, various selections have been made below regarding which of (i) Sandbox hosts or (ii) actual computing systems, will be performing a particular step of method 300. However, these selections can be varied depending upon the implementation, as readily appreciated by one of ordinary skill in the art, given the teachings of the present invention provided herein.

At step 310 (preparation on Sandbox hosts), compute a (well-known) difference set generated by each normal operation in a set of normal operations (performed on Sandbox hosts).

At step 320 (performed on each actual computing system), compute an actual difference set (of actual differences) generated by actual operations.

At step 330 (performed on each actual computing system), compute a target difference set (of target differences) by removing all of the well-known differences from the actual differences (that is, by subtracting the set of well-known differences from the set of actual differences).

At step 340 (performed on multiple actual computing systems), find a common set in the target differences from the multiple systems. That is, find a common set (of differences) in the target differences set of each of the multiple systems.

At step 350 (performed on each actual computing system), compute a smaller difference set by removing the common set from the target difference, and then set the smaller difference as a (refined) target difference.

At step 360, iterate between steps 340 and 350 until a common set (in the target differences from the multiple systems) cannot be found in step 340.

At step 370, output, for each of the actual computing systems, a most refined (i.e., from the last "successful iteration") target difference (after the iterations between steps 340 and 350).

FIG. 4 shows an exemplary method 400 for computing the difference between a snapshot of a (sandbox or an actual) system at time T and at T+ΔT, in accordance with an embodiment of the present invention.

At step 410, take a snapshot of sandbox at time T and store it in the data store.

At step 420, take a snapshot of sandbox at time T+ΔT and store it in the data store.

At step 430, compute the difference between the two snapshots by identifying files such that (i) the pair has different attributes, (ii) the pair has different hash values, (iii) the file has been added or deleted. In an embodiment, the difference computed at step 430 can relate to an operation that is performed between steps 410 and 420 (and, thus, is included in the second snapshot of step 420 but not the first snapshot of step 410).

A description will now be given regarding various difference operations, in accordance with an embodiment of the present invention.

Initially, the following difference operation is described: compute difference B by reducing X from other difference A, where difference A and difference B are the list of files (e.g., file names and/or file attributes and/or file hash values). In an embodiment, "compute difference B by reducing X from difference A" means compute the list of files each of which is not present in X but is present in A and then set the list of files as difference B. This is used to compute smaller difference from others.

Next, the following difference operation is described: find a common set in the differences (A1, A2, . . . , An). Each of the differences (A1. . . , An) is a list of files (e.g., file names and/or file attributes and/or file hash values). In an embodiment, "find a common set in the differences (A1, A2, . . . , An)" means:

(a) finding a relevant set of differences using: (a.i) similarity of images (e.g., using image data such as Operating System (OS) data, distribution data, creation data, updating data, and so forth); and (a.ii) relationship of images (e.g., using image metadata such as image history (e.g. Docker history), and so forth);

(b) finding the list of files all of which are commonly included in some set of differences; and (c) making the list of files a member of the common set.

The common set (in the differences A1, A2, . . . , An) is used to compute untargeted/commonly found parts of a difference and/or an untargeted/commonly found difference.

FIGS. 5-7 show another exemplary method 500 for snapshot difference processing, in accordance with an embodiment of the present invention. The method 500 can be used, for example, to prevent divulgation of sensitive data in two snapshots, taken at different times (e.g., time T and at time T+ΔT), of one or more same systems in a cloud environment.

In an embodiment, the two snapshots include at least one Virtual Machine (VM) image of the one or more same systems. In an embodiment, the two snapshots include at least one Sandbox-based image of the one or more same systems. In an embodiment, the two snapshots include at least one Sandbox-based image and at least one actual-system-based image of the one or more same systems.

At step 510, identify a set of files from among multiple file pairs. Each file pair is formed from a respective file that includes at least one difference with respect to each of the two snapshots. The at least one difference can include, but is not limited to, (i) different file attributes, (ii) different file hash values, and (iii) a status of one of the respective files being added or deleted relative to the other one of the respective files in a given file pair.

At step 520, perform a pattern reducing process that removes, from the set of files (initially identified at step 510), any of the files having, as the at least one difference, a predetermined non-sensitive difference between respective executions of a pre-determined system operation.

At step 530, perform a commonality reducing process that removes, from the set of files (initially identified at step 510 and potentially reduced by step 520), any files having, as the at least one difference, a common difference between different system users. In an embodiment, the common difference between the different system users can be determined based on data that include, but is not limited to, image content similarity data and image relationship data. In an embodiment, the image content similarity data can include, but is not limited to, operating system data, distribution data, file creation data, file update data, and so forth. In an embodiment, the image relationship data can include, but is not limited to, meta-data derived image history data (e.g., Docket data).

At step 540, iterate between the pattern reducing process of step 520 and the commonality reducing process of step 530 based on one or more iteration criterion. In an embodiment, the one or more iteration criterion can include an absence of further size reduction in the remaining ones of the files in the set, e.g., after the pattern reducing process of step 520.

At step 550 (upon completing iterating between the pattern reducing process of step 520 and the commonality reducing process of step 530), annotate data in remaining ones of the files in the set of files as potentially being the sensitive data. In an embodiment, the data can be annotated using a predetermined set of annotations. For example, in an embodiment, upon data in a remaining one of the files matching a preset list of data words and/or phrases, corresponding paired annotations can be used. These and other variations in implementing the annotating step are readily determined by one of ordinary skill in the art given the teachings of the present invention provided herein, while maintaining the spirit of the present invention.

At step 560, prompt the user to provide a user input indicating whether to delete the annotated data.

At step 565, determine whether the user input indicates to delete or not delete the annotated data. If the user input indicates to delete the annotated data, then proceed to step 570. Otherwise, proceed to step 580.

At step 570, delete the annotated data responsive to the user input.

At step 580, check the annotations of the annotated data to generate an annotation checking result. In an embodiment, the annotations can be checked for correspondence to a set of possible annotations. In an embodiment, the set of possible annotations can relate to one or more subjects that include, but are not limited to, privacy, security, malware, and so forth. In an embodiment, each of the possible annotations in the set can be paired with a respective annotation checking system reaction.

At step 585, determine whether the annotation checking result indicates a match with a possible annotation. If so, then proceed to step 590. Otherwise, terminate the method.

At step 590, perform the corresponding paired annotation checking system reaction. In an embodiment, the corresponding paired annotation checking system reaction can include, but is not limited to, modifying a system configuration of one or more systems in the cloud environment. The system configuration modification can involve powering down a system or portion thereof, isolating a system or a portion thereof, reconfiguring a system or portion thereof using a redacted snapshot (with the redaction directed to sensitive information identified by the present invention) and so forth.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
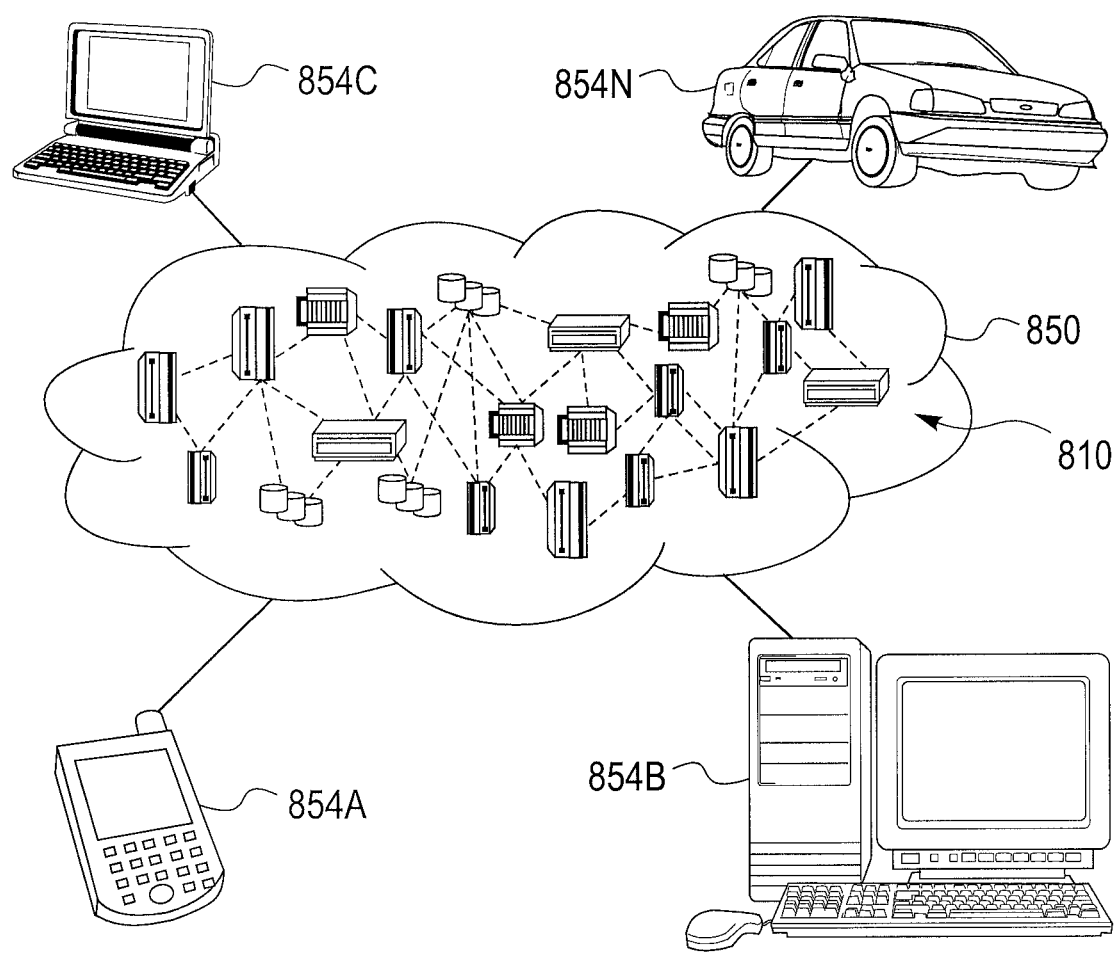
FIG. 8 shows an exemplary cloud computing environment, in accordance with an embodiment of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and privacy annotation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer program product for preventing divulgation of sensitive data in two snapshots, taken at different times, of one or more same systems in a cloud environment, the computer program product comprising a non-transitory computer readable storage medium having program instructions embodied therewith, the program instructions executable by a computer to cause the computer to perform a method comprising:

identifying, by a hardware processor of the computer, a set of files from among a plurality of file pairs, each of the plurality of file pairs being formed from a respective file that includes at least one difference with respect to each of the two snapshots;

performing, by the hardware processor, a pattern reducing process that removes, from the set of files, any of the files having, as the at least one difference, a predetermined nonsensitive difference between respective executions of a pre-determined system operation;

performing, by the hardware processor, a commonality reducing process that removes, from the set of files, any of the files having, as the at least one difference, a common difference between different system users; and annotating, by the hardware processor, data in remaining ones of the files in the set of files as potentially being the sensitive data, subsequent to said pattern reducing and commonality reducing processes;

prompting the user to provide a user input indicating whether to delete the annotated data; and deleting the annotated data responsive to the user input.

2. The computer program product of claim 1, wherein the method further comprises:

checking annotations of the annotated data to generate an annotation checking result; and modifying a system configuration of at least one of the one or more same systems, responsive to the annotation checking result.

3. The computer program product of claim 1, wherein the two snapshots comprise at least one Virtual Machine (VM) image of the one or more same systems of the cloud environment.

4. The computer program product of claim 1, wherein the two snapshots comprise at least one Sandbox-based image of the one or more same systems of the cloud environment.

5. The computer program product of claim 1, wherein the two snapshots comprise at least one Sandbox-based image and at least one actual-system-based image of the one or more same systems of the cloud environment.

6. The computer program product of claim 1, wherein each of the plurality of file pairs is formed based on the respective files therein having the at least one difference there between selected from the group consisting of (i) different attributes, (ii) different hash values and (iii) a status of one of the respective files being added or deleted relative to the other one of the respective files in a given one of the file pairs.

7. The computer program product of claim 1, wherein the common difference between the different system users is determined based on image content similarity data and image relationship data.

8. The computer program product of claim 7, wherein the image content similarity data is selected from the group consisting of operating system data, distribution data, file creation data, and file update data.

9. The computer program product of claim 7, wherein the image relationship data comprises meta-data derived image history data.

10. The computer program product of claim 1, wherein the predetermined non-sensitive difference between the respective executions of the pre-determined system operation is determined using a Sandbox host, and wherein the common difference between the different system users is determined using an actual one of the one or more systems.

11. The computer program product of claim 1, wherein the commonality reducing process and the pattern reducing process are iteratively performed based on one or more iteration criterion.

12. The computer program product of claim 11, wherein the one or more iteration criterion comprise an absence of further size reduction in the remaining ones of the files in the set.

13. A system for preventing divulgation of sensitive data in two snapshots, taken at different times, of one or more same systems in a cloud environment, the system comprising:

one or more hardware processors, configured to:

identify a set of files from among a plurality of file pairs, each of the plurality of file pairs being formed from a respective file that includes at least one difference with respect to each of the two snapshots;

perform a pattern reducing process that removes, from the set of files, any of the files having, as the at least one difference, a predetermined non-sensitive difference between respective executions of a pre-determined system operation;

perform a commonality reducing process that removes, from the set of files, any of the files having, as the at least one difference, a common difference between different system users: and annotate data in remaining ones of the files in the set of files as potentially being the sensitive data, subsequent to said pattern reducing and commonality reducing processes;

prompting the user to provide a user input indicating whether to delete the annotated data; and deleting the annotated data responsive to the user input.

14. The system of claim 13, wherein the common difference between the different system users is determined based on image content similarity data and image relationship data.

15. The system of claim 14, wherein the image content similarity data is selected from the group consisting of operating system data, distribution data, file creation data, and file update data.

16. The system of claim 14, wherein the image relationship data comprises meta-data derived image history data.

* * * * *